(12) United States Patent
Chan et al.

(10) Patent No.: US 7,571,015 B2
(45) Date of Patent: Aug. 4, 2009

(54) PERSONAL AUDIO PLAYER

(75) Inventors: Kai Kin Chan, Hong Kong (CN); Yuk Hang Leung, Hong Kong (CN); Sai Kit Lai, Hong Kong (CN); Jack Lau, Hong Kong (CN)

(73) Assignee: Perception Digital Limited, Kowloon (HK)

( * ) Notice: Subject to any disclaimer, the term of this patent is extended or adjusted under 35 U.S.C. 154(b) by 522 days.

(21) Appl. No.: 11/180,924

(22) Filed: Jul. 14, 2005

(65) Prior Publication Data
US 2007/0016314 A1  Jan. 18, 2007

(51) Int. Cl.
*G06F 17/00* (2006.01)
(52) U.S. Cl. ......................................... 700/94
(58) Field of Classification Search ............... 700/94; 434/307 A, 307 R; 369/4
See application file for complete search history.

(56) References Cited
U.S. PATENT DOCUMENTS

| | | | | |
|---|---|---|---|---|
| 6,332,175 | B1 * | 12/2001 | Birrell et al. | 711/112 |
| 6,582,235 | B1 * | 6/2003 | Tsai et al. | 434/307 A |
| 6,779,116 | B2 * | 8/2004 | Tagawa et al. | 713/193 |
| 7,349,719 | B2 * | 3/2008 | Buniatyan | 455/557 |
| 2004/0266337 | A1 * | 12/2004 | Radcliffe et al. | 455/3.06 |
| 2005/0212824 | A1 * | 9/2005 | Marcinkiewicz et al. | 345/690 |
| 2005/0240297 | A1 * | 10/2005 | Scotzin et al. | 700/94 |
| 2006/0103633 | A1 * | 5/2006 | Gioeli | 345/173 |

* cited by examiner

*Primary Examiner*—Curtis Kuntz
*Assistant Examiner*—Andrew C Flanders
(74) *Attorney, Agent, or Firm*—Leydig, Voit & Mayer, Ltd.

(57) ABSTRACT

A personal audio player has a housing, an audio output device in the housing and an audio player in the housing and coupled with the output device for storing and playing audio files. Multiple display panels are located on the housing. Each display panel is controlled to have a unique presentation format for presenting different information to a user. A user interface on the housing has different illumination colors respectively corresponding to different operation modes of the audio player. A lyrics processor outputs lyric text to one of the display panels in synchronisation with playing of a corresponding audio file.

5 Claims, 3 Drawing Sheets

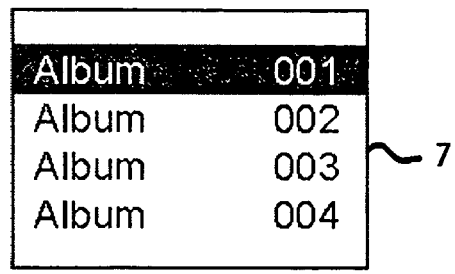
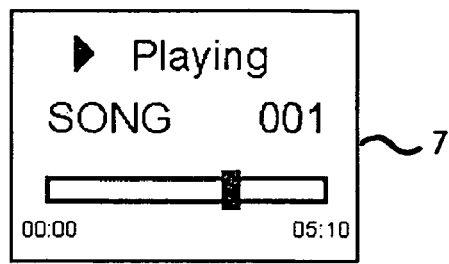
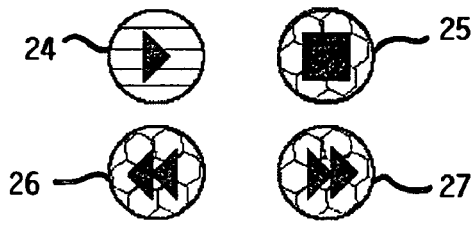
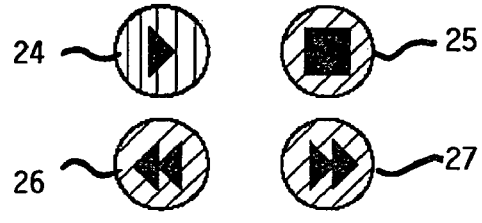
FIGURE 4
FIGURE 5
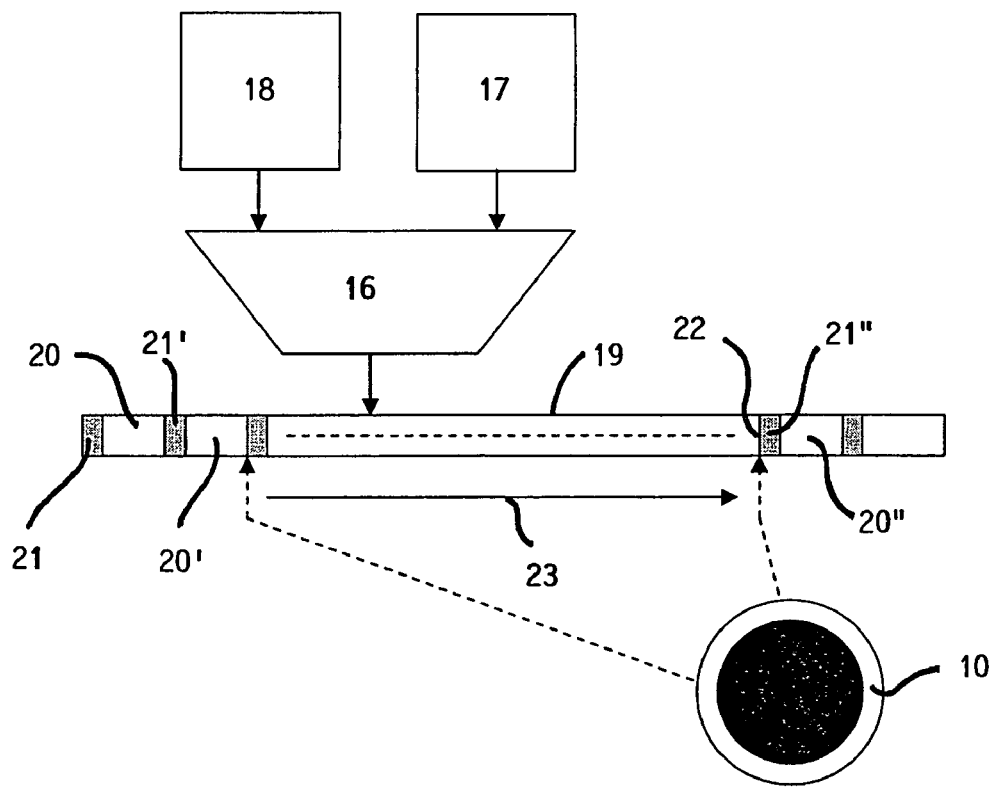
FIGURE 6

PERSONAL AUDIO PLAYER

BACKGROUND OF THE INVENTION

1. Field of the Invention

The current invention relates to personal audio players.

2. Description of the Prior Art

With the introduction of large capacity personal audio players their range of functions has increased considerably. Such players now also function as FM radios, photo and video clip players, voice/memo recorders and file storage devices. A large amount of content can be stored in the device. The displays on these devices are becoming more complex to allow the user to view content stored on the internal hard drive by list of album title, artist name, song title, genre, directory name and file name etc. The variety of complex functions the device performs also makes it necessary for the device to have a complex user interface. It is desirable to have an improved display and user interface scheme for better user experience.

In known audio players fast forward or fast rewind produces either no sound or distorted sound. The play time is typically shown during fast forward, but unless the user has memorised a time index for a song there is no way to tell if a desired position in a song is reached until the normal play speed is resumed.

SUMMARY OF THE INVENTION

It is an object of the present invention to provide a personal audio player with an improved display and user interface scheme for better user experience. It is a further object of the current invention to provide a personal audio player that ameliorates one or more of the above problems or at least provides the public with a useful alternative.

There is disclosed herein a personal audio player comprising a housing, an audio output device in the housing, an audio player in the housing and coupled with the output device for storing and playing audio files, and a plurality of display panels located on the housing for presenting information to a user, wherein each display panel is controlled to have a presentation format different to other ones of the display panels.

Preferably, the display panels are located in a side by side arrangement.

Preferably, each display panel has a different physical size.

Preferably, each display panel presents different information.

Preferably, the player further includes a user interface for performing a plurality of different operations of the audio player and having a plurality of different illumination colors corresponding to the different operations of the audio player.

Preferably, information for the different operations of the audio player is displayed on different ones of the display panels.

Preferably, the user interface includes at least one LED light source.

Preferably, the player further includes a lyrics processor for outputting lyric text to one of the display panels in synchronisation with playing of a corresponding audio file.

Preferably, the presentation format of the display panel receiving the lyric text is a single line scrolling text presentation format.

Preferably, the lyrics processor includes a multiplexer for multiplexing an audio file and a lyric file into a single data stream.

Further aspects of the invention will become apparent from the following drawings and description.

BRIEF DESCRIPTION OF THE DRAWINGS

Embodiments of the invention will now be described by way of example only and with reference to the accompanying drawings in which:

FIGS. 3 to 5 are schematic illustrations of the user interface arrangement for the audio player, and FIG. 6 is a schematic illustration of a lyric text processor function for the audio player.

DESCRIPTION OF THE PREFERRED EMBODIMENTS

Figure 1:
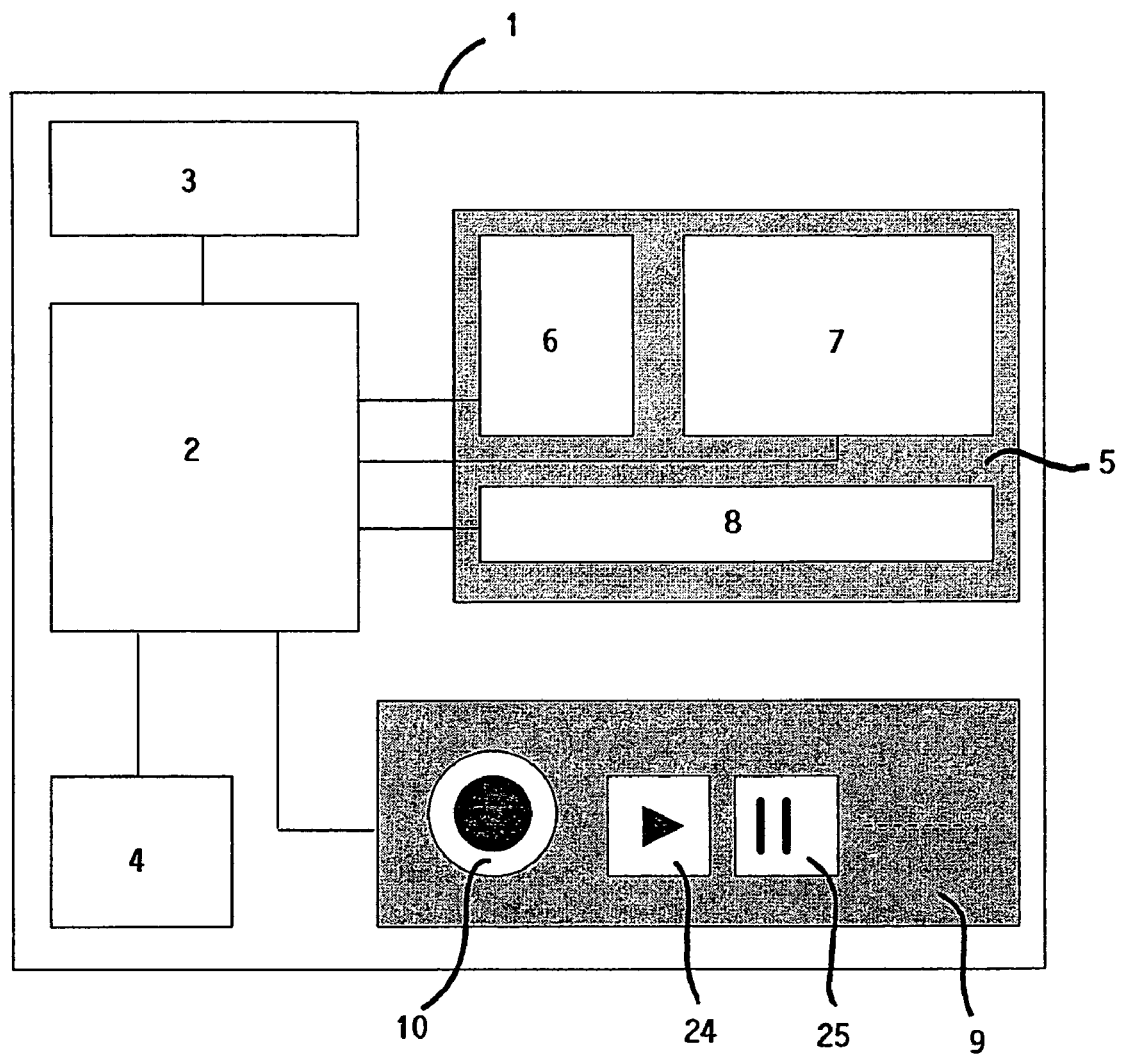
FIG. 1 is a schematic illustration of an audio player according to the invention.

In FIG. 1 there is depicted an audio player comprises a housing 1 enclosing a processor 2, data storage memory 3 and an audio output jack 4. Located on the housing 1 are a display area 5 and user interface area 9. The audio output jack 4 is a ⅛" (3.5 mm) mini stereo jack of known type for connection of conventional headphones (not shown). The data storage memory 3 is for storing audio and lyric data files as well as operating files for the processor 2. The processor 2 includes an audio player function for reading and playing audio files. The audio player function is well known in the art and most commonly uses the MP3 audio format. The processor 2 also includes a lyrics processor function for outputting lyric text to a lyric display 8 in synchronisation with playing of a corresponding audio file.

The display area 5 comprises three different display panels 6, 7, 8 in a side by side arrangement for presenting information to a user. The display panels 6, 7, 8 are all of different size, type and aspect ratios. The processor 2 controls the presentation format of each display panel for presenting different information to the user. The presentation format of each display panel is different to that of the other display panels and the size and aspect ratio of the display is tailored for the intended presentation format.

As user tends to read lyrics in sequence a display large enough to show entire song lyrics is not necessary. Instead, a long rectangular display 8 suitable for a single line scrolling text presentation format is provided for display of lyric content. Lists are easiest read when presented in a column format and so a relatively narrow and tall display panel 6 is provide to display lists of items such as play lists or stored audio file information by artist, album, song or genre in a column format. The third and wider display 7 suitable for a multi-column multi-line presentation format is provided for presentation of general information. The third display 7 is used to show player settings, menu and time/date information and during playback display is used to show artist, album and song name of the currently playing audio file as well as equalizer setting, frequency spectrum and current play time.

Figure 2:
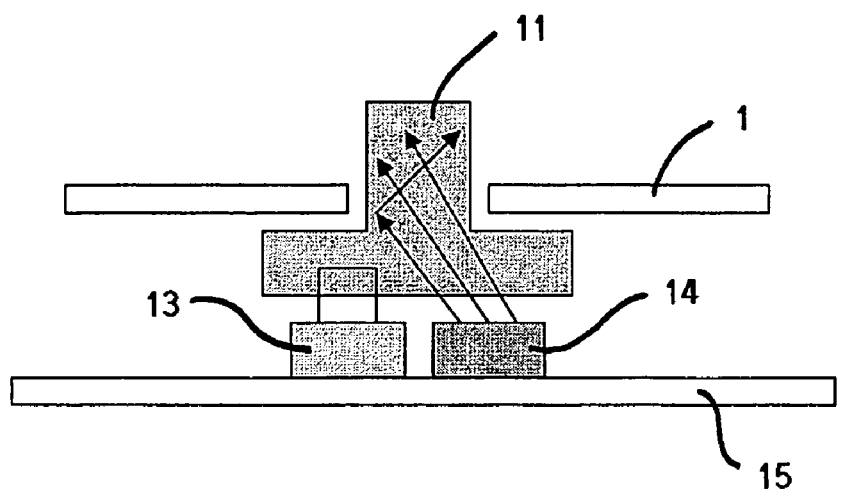
FIG. 2 is a schematic illustration of a user interface button for the audio player.

The user interface area 9 includes a scroll wheel 10 and buttons 11, 12 for performing a plurality of different operations of the audio player. FIG. 2 shows the simplified structure of a user interface button 11. The scroll wheel 10 and buttons 11, 12 are made of semi-transparent material with light diffusing capability. The top portion of the button, say 11 projects through an opening in the housing 1. The button is mounted on a PCB 15 above a switch contact 13 and a tri-color (green, red, blue) light emitting diode (LED) light source 14. The button 11 will change color when the tri-color LED underneath it changes color. The LED 14 is controlled to change color to correspond to the current operation mode of audio player and whether the button 11 is functional during that operation mode. The button 11 shows green when it is enabled or used for a particular operation of the audio player, blue when it is disabled or meaningless in the current operation mode and red when the particular function that the button is currently assigned to is executing.

Figure 3:
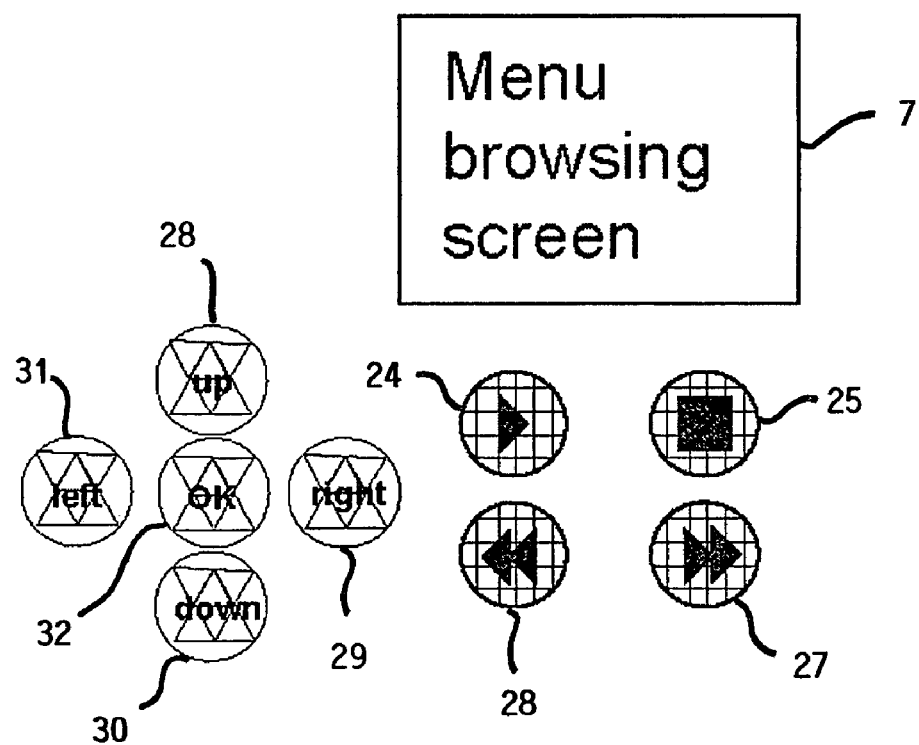

FIGS. 3 to 5 are schematic illustrations of the user interface arrangement for the audio player. When browsing the menu, FIG. 3, only the navigation buttons Up 28, Down 30, Left 31, Right 29 and OK 32 are illuminated green showing that navigation is possible. The remaining playback buttons Play/Pause 24, FRW 26, FFW 27 and Stop 25 are illuminated orange showing that playback is not possible. When the user selects a album or song, FIG. 4, then the Play/pause button 24 will turned green while the FRW 26, FFW 27 and Stop 25 buttons remain orange. When the player is playing a particular song or album, FIG. 5, the Play button 24 will turn red and the FRW 26, FFW 27 and Stop 25 buttons will turn green. The buttons changes color to indicate the use mode to guide the user in navigating the unit.

In one embodiment of the invention the lyric text scrolling on display 8 is synchronized to the playing speed of the corresponding audio file during normal play and fast forward or fast rewind events. The fast forward and fast rewind events are controlled by the movement speed of the scroll wheel 10. If the user spins the wheel faster the playback speed and lyric text will scroll faster and likewise if the user spins the wheel slower the playback speed and lyric text will scroll slower. With the synchronized lyric display the user can locate the designated position of the song easily.

Referring to FIG. 6, to control synchronisation at variable speeds the lyric processor combines a time stamped lyric file (e.g. SNC, LRC and Lyrics 3) 17 with the corresponding audio data file 18 to form an anchored data stream 19 in the internal memory. This is done by a multiplexer 16 that combines the audio file 18 and lyric file 17 into the single data stream 19. The number of bytes in audio data 20 and number of bytes in lyric data 21 can be varied. For example, x1 bytes of audio data 20 followed by y1 bytes of lyric data 21, and then x2 more bytes of audio data 20 and so on. An anchor is used to mark the start of lyric data 22 in the data stream 19.

The number of degrees the scroll wheel 10 is rotated in a unit of time is used to compute the difference from the current position in the data stream to the destination position in the data stream. This offset 23 is calculated as $C \times n \times b$: where C is a scaling constant, n is the number of degrees of rotated and b is the bit-rate per unit of time. The scaling constant is tailored for a particular scroll wheel type and the bit-rate is the bit-rate of the encoded song or average bit-rate if the song is encoded in variable bit-rate format. After the offset 23 is computed the lyric process will skip the computed number of bytes, scan for the next available anchor and display the lyric associated with the anchor. The calculation and skip forward are repeated while the scroll whelp is being moved to update the lyric text display.

It should be appreciated that modifications and alternations obvious to those skilled in the art are not to be considered as beyond the scope of the present invention.

What is claimed is:

1. A personal audio player comprising:
a housing;
an audio output device in the housing;
an audio player in the housing, coupled to the audio output device, and storing and playing audio files, and lyrics files;
a plurality of display panels located on the housing, side-by-side for simultaneous viewing, each display panel displaying respective, different information, wherein each display panel is controlled to provide a respective, different presentation format, and
the plurality of display panels comprises a single line display panel and a multiple line display panel; and
a lyrics processor including a multiplexer multiplexing an audio file and a lyrics file stored in the audio player into a single data stream comprising both audio and lyrics information and outputting scrolling lyrics text to the single line display panel in synchronization with playing of the audio file.

2. A personal audio player comprising:
a data storage medium storing, separately, audio files and lyrics files;
an audio output device;
an audio player, coupled to the audio output device and playing audio files stored in the data storage medium;
a display panel displaying information; and
a lyrics processor including a multiplexer multiplexing an audio file stored in the data storage medium and a lyrics file stored in the data storage medium into a single data stream comprising both audio and lyrics information and outputting scrolling lyrics text to the display panel in synchronization with playing of the audio file by the audio player.

3. The personal audio player of claim 2, including a user interface for selecting from a plurality of operations of the audio player including altering playing speed of the audio file and scrolling speed of the lyrics text being output.

4. The personal audio player of claim 3, wherein the user interface includes a scroll wheel device rotatable to change the playing speed of the audio file and the scrolling speed of the lyrics text.

5. The personal audio player of claim 2, wherein the display panel displays a single line of scrolling text.

* * * * *